(12) United States Patent
Wingender et al.

(10) Patent No.: US 10,682,996 B2
(45) Date of Patent: Jun. 16, 2020

(54) ELECTROMECHANICAL BRAKE FORCE BOOSTER

(71) Applicants: Lucas Automotive GmbH, Koblenz (DE); ZF Friedrichshafen AG, Friedrichshafen (DE)

(72) Inventors: Kurt Wingender, Hartenfels (DE); Martin Hofmann, Mendig (DE); Boris Koeth, Weitersburg (DE); Jose Manuel Calvo Martinez, Kruft (DE); Jens Sparfeld, Miehlen (DE); Stefan Kammers, Oberstadtfeld (DE); Paul Warkentin, Neuwied (DE); Ingo Decker, Friedrichshafen (DE); Klemens Humm, Immenstaad (DE); Detlef Baasch, Oberteuringen (DE)

(73) Assignees: ZF Active Safety GmbH, Koblenz (DE); ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/761,094

(22) PCT Filed: Sep. 16, 2016

(86) PCT No.: PCT/EP2016/072052
§ 371 (c)(1),
(2) Date: Mar. 17, 2018

(87) PCT Pub. No.: WO2017/046380
PCT Pub. Date: Mar. 23, 2017

(65) Prior Publication Data
US 2018/0257619 A1    Sep. 13, 2018

(30) Foreign Application Priority Data

Sep. 17, 2015   (DE) .................... 10 2015 012 124
Sep. 17, 2015   (DE) .................... 10 2015 012 125

(51) Int. Cl.
*B60T 13/74*     (2006.01)
*B60T 8/48*      (2006.01)
(Continued)

(52) U.S. Cl.
CPC .......... *B60T 8/4854* (2013.01); *B60T 13/741* (2013.01); *B60T 13/745* (2013.01); *F16H 1/22* (2013.01);
(Continued)

(58) Field of Classification Search
CPC ...... F16H 19/04; F16H 19/043; B60T 13/745; B60T 13/746; F16D 2125/46; F16D 2125/48; F16D 2125/24
See application file for complete search history.

(56) References Cited

U.S. PATENT DOCUMENTS 4,395,883 A * 8/1983 Melinat ................ B60T 13/745
60/545
5,875,681 A    3/1999 Gerrand et al.
(Continued)

FOREIGN PATENT DOCUMENTS

DE         10009390 A1    9/2001
DE     102009001142 A1    8/2010
(Continued)

OTHER PUBLICATIONS

PCT International Search Report and the Written Opinion, Application No. PCT/EP2016/072052 filed Sep. 16, 2016, dated Nov. 15, 2016.
(Continued)

*Primary Examiner* — Bradley T King
*Assistant Examiner* — Stephen M Bowes
(74) *Attorney, Agent, or Firm* — MacMillan, Sobanski & Todd, LLC

(57) ABSTRACT

The electromechanical brake force booster for a vehicle brake system comprises a drive arrangement for driving at
(Continued)

least one actuating device which is designed for actuating a brake cylinder. The drive arrangement has at least one electric motor and a gearing for coupling the electric motor to the at least one actuating device. The gearing comprises at least one second spur gear and at least one first spur gear. Furthermore, the gearing has an intermediate gearing stage. The intermediate gearing stage couples the electric motor to the second spur gear and to the first spur gear in torque-transmitting fashion. The intermediate gearing stage drives the second spur gear directly and the first spur gear via at least one intermediate gear.

20 Claims, 15 Drawing Sheets

(51) Int. Cl.
  *F16H 19/04* (2006.01)
  *F16H 35/18* (2006.01)
  *F16H 1/22* (2006.01)
(52) U.S. Cl.
  CPC ............ *F16H 1/225* (2013.01); *F16H 19/04* (2013.01); *F16H 35/18* (2013.01); *B60T 13/746* (2013.01)

(56) References Cited

U.S. PATENT DOCUMENTS

| | | | |
|---|---|---|---|
| 6,047,546 A * | 4/2000 | Takeyama | ............ B60T 13/745 60/533 |
| 7,581,714 B2 | 9/2009 | Machu | |
| 8,997,482 B2 | 4/2015 | Richard et al. | |
| 9,139,186 B2 | 9/2015 | Vollert et al. | |
| 9,650,028 B2 | 5/2017 | Cagnac | |
| 2009/0247364 A1* | 10/2009 | Sano | ............ B60T 13/746 477/197 |
| 2010/0126167 A1* | 5/2010 | Nagel | ............ B60T 7/042 60/545 |
| 2012/0042647 A1* | 2/2012 | Vollert | ............ B60T 13/745 60/545 |
| 2014/0208894 A1 | 7/2014 | Miller | |
| 2014/0262641 A1* | 9/2014 | Richard | ............ B60T 13/746 188/156 |
| 2015/0144438 A1* | 5/2015 | Park | ............ F16D 65/14 188/72.1 |
| 2015/0197231 A1 | 7/2015 | Winkler et al. | |
| 2015/0308527 A1 | 10/2015 | Nagel et al. | |
| 2016/0121869 A1* | 5/2016 | Cann | ............ B60T 13/746 188/156 |

FOREIGN PATENT DOCUMENTS

| | | | | |
|---|---|---|---|---|
| DE | 102011080979 A1 | 1/2013 | | |
| DE | 102012014361 A1 | 1/2014 | | |
| DE | 102013007574 A1 | 11/2014 | | |
| DE | 102013217745 A1 | 3/2015 | | |
| DE | 102015204328 A1 * | 9/2015 | ............ | B60T 11/04 |
| EP | 0792779 A1 | 9/1997 | | |
| EP | 2292483 A1 | 3/2011 | | |
| EP | 2420421 A1 | 2/2012 | | |
| EP | 2465741 A1 | 6/2012 | | |
| EP | 2781779 A1 | 9/2014 | | |
| WO | 2006/079759 A1 | 8/2006 | | |
| WO | 2011/003643 A1 | 1/2011 | | |
| WO | 2011/026804 A1 | 3/2011 | | |
| WO | 2014/012702 A1 | 1/2014 | | |
| WO | 2014/090468 A1 | 6/2014 | | |
| WO | 2014/177691 A1 | 11/2014 | | |

OTHER PUBLICATIONS

PCT International Preliminary Report on Patentability, Application No. PCT/EP2016/072052 filed Sep. 16, 2016, dated Oct. 27, 2017.

* cited by examiner

ELECTROMECHANICAL BRAKE FORCE BOOSTER

CROSS-REFERENCE TO RELATED APPLICATIONS

This application is the National Phase of International Application PCT/EP2016/072052 filed Sep. 16, 2016 which designated the U.S. and that International Application was published in English under PCT Article 21(2) on Mar. 23, 2017 as International Publication Number WO 2017/046380 A1. PCT/EP2016/072052 claims priority to German Applications No. 10 2015 012 124.3, filed Sep. 17, 2015, and No. 10 2015 012 125.1, filed Sep. 17, 2015. Thus, the subject nonprovisional application claims priority to DE 10 2015 012 124.3 and DE 10 2015 012 125.1, filed Sep. 17, 2015. The disclosures of aforementioned applications are incorporated herein by reference.

BACKGROUND OF THE INVENTION

The present disclosure relates in general to the technical field of electrohydraulic brake force generating devices. It relates in particular to an electromechanical brake force booster which can be used in an electrohydraulic brake force generating device.

Electromechanical brake force boosters are driven by electric motors. In order to be able to produce a boosting of the brake force with the brake force booster, the rotational movement of the output shaft of the electric motor has to be converted into a translatory movement. For this purpose, various devices are known from the prior art.

WO 2014/177691 discloses a brake system with a main brake cylinder and a servo brake. The servo brake has an electric motor, the driven shaft of which bears a screw. The screw drives two helical gearwheels. The helical gearwheels are each connected to a spur gear via a shaft. The spur gears each drive a rack in order to be able to move a thrust rod for actuating the main cylinder.

Document WO 2011/003643 A1 discloses a force transmission arrangement. The force transmission arrangement has an electric motor which drives a worm shaft. A worm toothing is formed on the worm shaft. The force transmission arrangement furthermore comprises a first worm gear, a second worm gear, a first pinion and a second pinion. A rack has a first row of teeth and a second row of teeth. The longitudinal axis of the rack runs parallel to the axis of the worm shaft. The first pinion meshes with the first row of teeth and the second pinion meshes with the second row of teeth. The first pinion is connected to the first worm gear, and therefore the first worm gear and the first pinion rotate together. In the same manner, the second worm gear is connected to the second pinion. The first worm gear and the second worm gear are jointly driven by the worm toothing on the worm shaft.

An electromechanical brake force booster is furthermore known from the prior art and is disclosed in the document EP 2420421 A1. The electromechanical brake force booster has an electric motor, a thrust rod and a drive device for driving the thrust rod. A drive shaft of the electric motor drives a first gearwheel with an external toothing and a second gearwheel with an internal toothing. The first gearwheel drives a first toothed wheel and the second gearwheel drives a second toothed wheel. The first toothed wheel and the second toothed wheel engage in a toothing on the thrust rod for the translatory driving of the thrust rod.

The devices known from the prior art are relatively large due to their design or their construction. The reason resides, inter alia, in the complex construction of the gearing arrangements described in the documents mentioned for converting a rotation into a translatory movement.

SUMMARY OF THE INVENTION

An electromechanical brake force booster with a compact construction and therefore reduced requirement for construction space is to be specified.

The electromechanical brake force booster for a vehicle brake system comprises a drive arrangement for driving at least one actuating device which is designed for actuating a brake cylinder. The drive arrangement has at least one electric motor and a gearing for coupling the electric motor to the at least one actuating device. The gearing has at least one first spur gear and at least one second spur gear. Furthermore, the gearing has an intermediate gearing stage. The intermediate gearing stage couples the electric motor to the first spur gear and to the second spur gear in torque-transmitting fashion. The intermediate gearing stage drives the first spur gear directly and drives the second spur gear via at least one intermediate gear.

The use of spur gears makes it possible in some embodiments to provide a compact and construction-space-saving gearing specifically in the direction of the axis of rotation of the electric motor. The compact construction of the gearing can thus lead to a drive arrangement of an electromechanical brake force booster, said drive arrangement taking up little construction space in a vehicle.

The intermediate gear can likewise be designed in the form of a spur gear, i.e. the intermediate gear can have an external toothing. The effect achieved with the intermediate gear, according to one variant (for example exclusively, i.e. without a step-up or step-down) is that the direction of rotation of the second spur gear is reversed in comparison to the direction of rotation of the first spur gear. The first spur gear and the second spur gear therefore rotate in opposite directions. The gearing here is configured to the effect that the rotational movement of the output shaft of the electric motor is converted into a translatory movement of the actuating device. This can be achieved inter alia by the spur gears which are driven with opposite directions of rotation. By means of the translatory movement of the actuating device, the brake cylinder can be be actuated in order to generate a brake force.

The intermediate gearing stage can have at least one first gearwheel and at least one second gearwheel coaxial to the first gearwheel. The first gearwheel and the second gearwheel can be designed in the form of spur gears. The first gearwheel and the second gearwheel can be connected to each other for conjoint rotation. The first gearwheel can have a larger diameter than the second gearwheel. Since the second gearwheel can have a smaller diameter than the first gearwheel, the intermediate gearing stage can provide a step-down. The first gearwheel and the second gearwheel determine an axis of rotation of the intermediate gearing stage. The axis of rotation of the intermediate gearing stage can extend perpendicularly to the longitudinal axis of the actuating device.

The gearing can have an input gearwheel which is driven by the electric motor. The input gearwheel can drive the first gearwheel of the intermediate gearing stage. The first gearwheel of the intermediate gearing stage can be in torque-transmitting engagement directly with the input gearwheel of the gearing. The torque which is produced by the electric motor and drives the input gearwheel can be transmitted from the input gearwheel directly to the first gearwheel of the intermediate gearing stage.

The second gearwheel can drive the first spur gear directly and the second spur gear via the at least one intermediate gear. The second gearwheel can be directly in torque-transmitting engagement both with the first spur gear and with the intermediate gear. The intermediate gear which is driven by the second gearwheel can be in torque-transmitting engagement with the second spur gear. The intermediate gear drives the second spur gear in the opposite direction to the direction of rotation of the first spur gear.

The intermediate gearing unit can be designed as a spur gearing. The first gearwheel and the at least one second gearwheel, which is arranged coaxially with respect to the first gearwheel, of the intermediate gearing unit can be designed in the form of a double gearwheel. Said double gearwheel can determine the axis of rotation of the intermediate gearing unit.

The first gearwheel of the intermediate gearing stage can be arranged offset with respect to the second gearwheel of the intermediate gearing stage, the first spur gear and the second spur gear in the direction of the axis of rotation of the electric motor. The input gearwheel and the first gearwheel of the intermediate gearing stage can be arranged in a first plane in the direction of the axis of rotation of the electric motor. The second gearwheel, the first spur gear, the intermediate gear and the second spur gear can be arranged in a second plane in the direction of the axis of rotation of the electric motor. The first plane and the second plane can be arranged offset with respect to each other in the direction of the axis of rotation of the electric motor. A torque-transmitting connection between the first plane and the second plane can be produced via the intermediate gearing stage with its two gearwheels.

The brake force booster can have a clutch. The clutch can be provided between the electric motor and the gearing. The clutch can couple the output shaft of the electric motor to an input shaft of the gearing. Overload damage to the electric motor and/or the gearing because of an excessive torque can be prevented with the clutch. High torques may occur, for example, if the electric motor begins to drive the gearing, or if the motor ends the drive of the gearing. The clutch can be realized in the form of a dog clutch. The output shaft of the motor and the input shaft of the gearing can each be assigned a clutch part of the clutch. The clutch parts can have projections which project in the direction of the axis of rotation of the electric motor and can be brought into engagement with one another in order to transmit torque. The clutch can furthermore have an intermediate piece which is arranged between the two clutch parts. The intermediate piece can be of substantially star-shaped design. The intermediate piece can have a multiplicity of arms which extend away from a central region of the intermediate piece. The intermediate piece can be designed in such a manner that an arm of the intermediate piece is located in each case between the projections of the two clutch parts. The intermediate piece can be produced from an elastic or flexible material. On the input shaft of the gearing, the input gearwheel which is driven by the electric motor can be provided on the input shaft of the gearing. By means of the clutch, the installation or removal of the electric motor on or from the brake force booster or the actuating device can be simplified. The electric motor together with the housing part assigned thereto forms a module which can be released from the gearing and connected thereto rapidly and simply by means of the clutch.

The electromechanical brake force booster can have a multipart housing. At least one housing part can be assigned to the gearing. Further housing parts can be assigned, for example, to the actuating device and to the electric motor. The input shaft of the gearing can be mounted on the housing part assigned to the gearing. A corresponding bearing point for the input shaft can be formed on the housing part. The input shaft can be mounted on the bearing point of the housing part via a bearing element. Furthermore, the intermediate gearing stage can be mounted on the housing part. The intermediate gearing stage can have a shaft portion on which a bearing element can be arranged. The shaft portion can extend along the axis of rotation of the intermediate gearing stage. A bearing point for the bearing element of the intermediate gearing stage can be formed on the housing part. Rolling bearings can be used as the bearing elements. Ball bearings or needle bearings, for example, can be used for mounting the input shaft and/or the intermediate gearing stage.

The at least one actuating device can have at least one rack portion. The at least one rack portion can be provided on the second actuating element since the second actuating element is intended to be driven primarily by the gearing. A first rack portion and a second rack portion which are couplable to the gearing can be provided on the at least one actuating device.

One of the spur gears can be coupled to the at least one rack portion. In this case, the first rack portion can be coupled to the first spur gear and the second rack portion can be coupled to the second spur gear. Each spur gear can be coupled to one of the rack portions via a shaft and a gearwheel arranged thereon. The spur gears and the gearwheels assigned thereto for driving the actuating device can be connected to one another for conjoint rotation. The spur gears and the gearwheels assigned thereto can also be designed in the form of a double gearwheel. The gearwheels can have a smaller diameter than the spur gears. The two rack portions can be provided on opposite sides of the actuating device.

Depending on the construction space present in the vehicle, the units of the drive arrangement, such as gearing and electric motor, can be arranged on different sides of the actuating device. The electric motor and the gearing can be arranged on opposite sides of the actuating device. The electric motor can therefore be arranged on one side of the actuating device and the gearing can be arranged on that side of the actuating device which faces away from the side with the electric motor. As a result, both the electric motor and the gearing can be arranged close to the actuating device in order to achieve a construction-space-saving and compact construction of the brake force booster. The input shaft of the gearing can extend transversely with respect to the longitudinal axis of the actuating device. Starting from the gearing on one side of the actuating device, the input shaft of the gearing can extend transversely with respect to the longitudinal axis of the actuating device in the direction of the electric motor or of the fastening point of the electric motor. On that side of the actuating device on which the motor is arranged, the input shaft of the gearing can be coupled to the output shaft of the motor.

The first spur gear, the second spur gear and the intermediate gear can have a helical toothing. Furthermore, the input gearwheel on the input shaft of the gearing, the first gearwheel and the second gearwheel of the intermediate gearing stage can also have a helical toothing. Owing to the helical toothing, only relatively few teeth are required for transmitting torque between the individual gearwheels. This is true in particular for the input gearwheel which is driven by the electric motor and for the second gearwheel of the intermediate gearing stage. With such gearwheels having a low number of teeth, a relatively high step-down ratio can be achieved. Furthermore, the gearwheels with a helical toothing can be of relatively small design because of the small number of teeth, which leads to a compact construction of the gearing. Smaller gearwheels furthermore permit a small distance between the axes of the individual gearwheels, which likewise leads to a compact construction of the gearing. Helical toothings with a relatively large helix angle are also referred to as an evoloid toothing.

The first spur gear and the second spur gear can each be connected to a shaft provided with a gearwheel. The spur gears can be designed as a double gearwheel together with the gearwheels. The gearwheels on the shafts driven by the first spur gear and the second spur gear can each engage in at least one rack portion. The at least one rack portion can be provided on the at least one actuating device. The rotational movement of the spur gears and of the gearwheels connected to the spur gears via shafts is converted via the rack portion into a translatory movement which can move the actuating device in the direction of the brake cylinder or away from the brake cylinder. A first rack portion and a second rack portion can be provided on the at least one actuating device. The first rack portion can interact with the first spur gear and the second rack portion can interact with the second spur gear.

The drive arrangement can have a control unit which is designed for activating the at least one electric motor. The control unit can be arranged between the motor and the gearing or between the motor and the actuating device. The control unit can be accommodated in a housing part assigned to the actuating device. The control unit can be designed in such a manner that it is accessible after removal of the motor. The at least one control unit can have a sensor arrangement or can be connected to a sensor arrangement. The sensor arrangement can be configured, for example, to make it possible to determine the necessary boosting of the brake force exerted on the brake pedal. On the basis of the measured values by the sensor arrangement, it is then possible to identify the boosting force which has to be provided in particular by the electric motor via the gearing. The measured values sensed by the sensor arrangement therefore supply an indicator of which boosting force has to be generated by the electric motor together with the gearing and transmitted to the at least one actuating device. Individual sensors of the sensor arrangement can be integrated in the electric motor and/or in the control unit. The boosting force to be supplied by the electromechanical force booster can depend on a driver's braking requirement sensed by the sensor arrangement or on commands from a program regulating the driving dynamics. The braking requirement can be sensed by the at least one sensor arrangement and converted by the at least one control unit into corresponding drive signals for the electric motor. The braking requirement can be determined, for example, by sensing a brake pedal travel and/or a pedal actuating force acting on the brake pedal. One or more regulating programs of the driving dynamics, such as, for example, an antilock system (ABS), acceleration spin regulation (ASR) or an electronic stability program (ESP) can be stored in the control unit.

The drive arrangement can be arranged in a state mounted in a vehicle in such a manner that the axis of rotation of the electric motor runs perpendicularly to the longitudinal axis of the actuating device and at a predetermined angle with respect to the vertical axis of the vehicle. The electric motor can be arranged as close as possible to the actuating device driven by it, as a result of which a compact and construction-space-saving construction of the electromechanical brake force booster is achieved. The positioning of the drive arrangement of the electromechanical brake force booster at a predetermined angle with respect to the vertical axis of the vehicle permits improved use of the construction space which is present in the vehicle and is determined by the fastening points which are present in a vehicle or are predetermined. The drive arrangement can be oriented and arranged here in such a manner that the construction space present in a vehicle can be utilized in the best possible way with respect to the predetermined fastening points. The axis of rotation of the electric motor can extend at every conceivable angle with respect to the vertical axis of the vehicle. The axis of rotation of the electric motor can also extend, for example, at an angle of 0° with respect to the vertical axis of the vehicle and can therefore run parallel to the vertical axis. The axis of rotation of the electric motor can also run at an angle of 45 degrees or 135 degrees with respect to the vertical axis of the vehicle, to mention further examples.

The actuating device can comprise at least one actuating unit which can be acted upon with a pedal actuating force exerted on a brake pedal. In addition to the actuating unit, the actuating device can have at least one actuating element which is driven by the electric motor via the gearing. The actuating unit can be accommodated at least in sections in the actuating element. The actuating unit and the actuating element can interact in order to transmit a brake force to the brake cylinder. In this case, it can be provided that at least part of the brake force exerted on the actuating unit by the brake pedal is transmitted directly to the brake cylinder. The electric motor can be activated by the control unit on the basis of the sensed brake force requested by the driver via the brake pedal. The electric motor can move the actuating element via the gearing in order to generate a boosting force in the direction of the brake cylinder. The actuating unit and the actuating element are moved in the direction of the brake cylinder in order to generate a brake pressure on the wheel brakes via the brake cylinder.

Fastening points for attaching a brake force booster together with a brake cylinder are provided in a vehicle. Said fastening points are generally predetermined by the vehicle manufacturers. The electromechanical brake force booster can have at least one fastening device which can be attached to the fastening points provided in the vehicle. The fastening device can have, for example, a flange with openings and fastening bolts which are accommodated in the openings of the flange. The brake force booster can be attached together with the brake cylinder to the vehicle to the vehicle via the fastening bolts. The brake cylinder and the electromechanical brake force booster can form an assembly. The fastening device defines a fastening plane. The axis of rotation of the electric motor can run at an angle of 60 to 120° with respect to the fastening plane.

A further aspect is an electrohydraulic motor vehicle brake system comprising an electromechanical brake force booster of the type described above.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
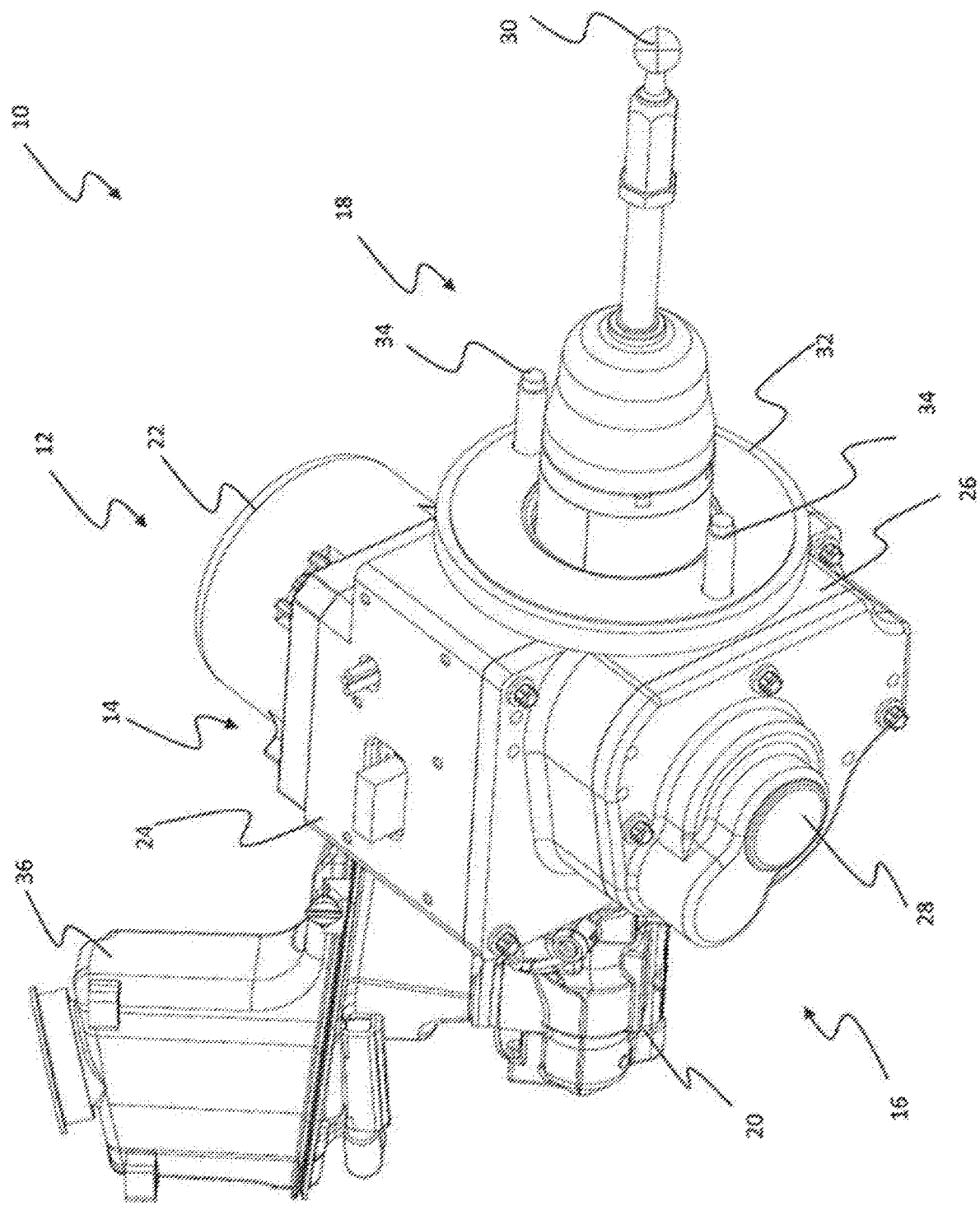
FIG. 1 shows a perspective view of an electromechanical brake force booster according to an exemplary embodiment.

FIG. 1 shows a perspective view of an electromechanical brake force booster which is denoted in general by 10.

The electromechanical brake force booster 10 comprises a motor 12, a control unit 14, a gearing 16 and an actuating device 18. The actuating device 18 is coupled to a brake cylinder 20.

The brake force booster 10 has a multipart housing with housing parts 22, 24, 26 and 28. The housing parts 22 and 24 are assigned to the motor 12, the control unit 14 and the actuating device 18. The housing parts 26 and 28 serve for receiving the gearing 14. The motor 12 is arranged on a side of the actuating device 18 that faces away from the side of the actuating device with the gearing 16. The electromechanical brake force booster 10 and the brake cylinder 20 form an assembly.

The actuating device 18 has an actuating member 30 which is actuatable via a pedal force produced by a driver of the vehicle, and serves for actuating the brake cylinder 20 and the electromechanical brake force booster 10. Furthermore, the actuating device 18 extends through an annular covering element 32. Fastening elements 34 which can serve for fastening a pedal arrangement in the interior of the vehicle extend through the annular covering element 32. The fastening elements 34 are attached to the housing parts 24 and 26 and are designed in the form of bolts. In the state attached to the vehicle, the bulkhead extends between the housing parts 22, 24, 26 and 28 and the covering element 32. A container 36 for brake fluid is arranged on the brake cylinder 20.

Figure 2:
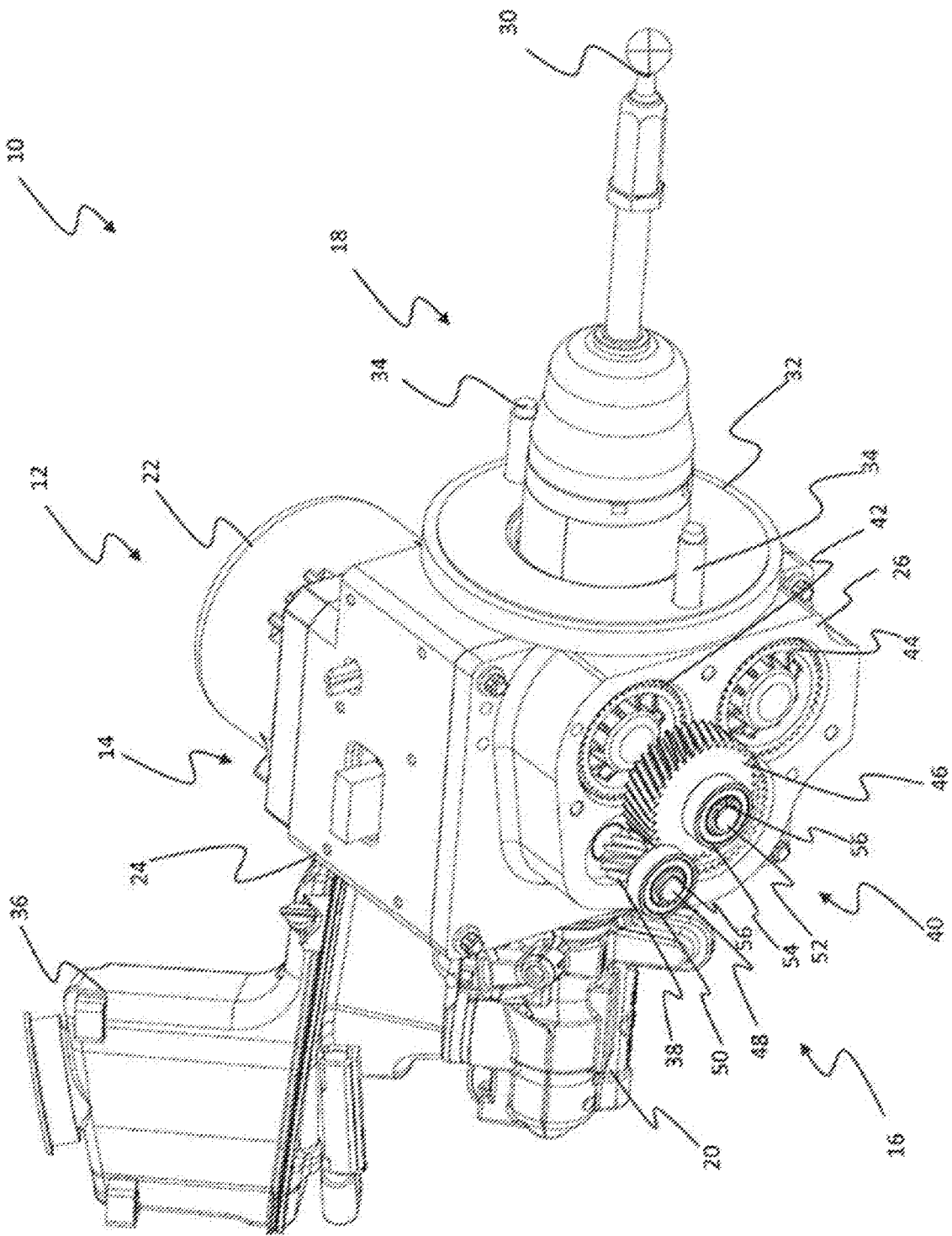
FIG. 2 shows a perspective view of an electromechanical brake force booster according to an exemplary embodiment.

FIG. 2 shows a perspective view of the electromechanical brake force booster 10 in which the housing part 28 has been removed. The gearing 16 has an input gearwheel 38, an intermediate gearing stage 40, a first spur gear 42 and a second spur gear 44. Of the intermediate gearing stage 40, the first gearwheel 46 can be seen in FIG. 2. The first gearwheel 42 of the intermediate gearing stage 40 is in torque-transmitting engagement with the input gearwheel 38. The first spur gear 42 and the second spur gear 44 are driven by the intermediate gearing stage 40. The spur gears 42 and 44 drive the actuating device 18.

The input gearwheel 38 is arranged on an input shaft 48 of the gearing 16. The input shaft 48 has a bearing element 50. The input shaft 48 is mounted via the bearing element 50 on a bearing point formed on the housing part 28 (see FIG. 1). The intermediate gearing stage 40 has a shaft portion 52 which extends along the axis of rotation of the intermediate gearing stage 40. A bearing element 54 via which the intermediate gearing stage 40 is mounted on a bearing point formed on the housing part 28 is provided on the shaft portion 52. The bearing elements 50 and 54 are held on the input shaft 48 and the shaft portion 52 of the intermediate gearing stage 40 by securing rings 56. The bearing elements 50 and 54 can be rolling bearings, such as, for example, ball bearings.

Figure 3:
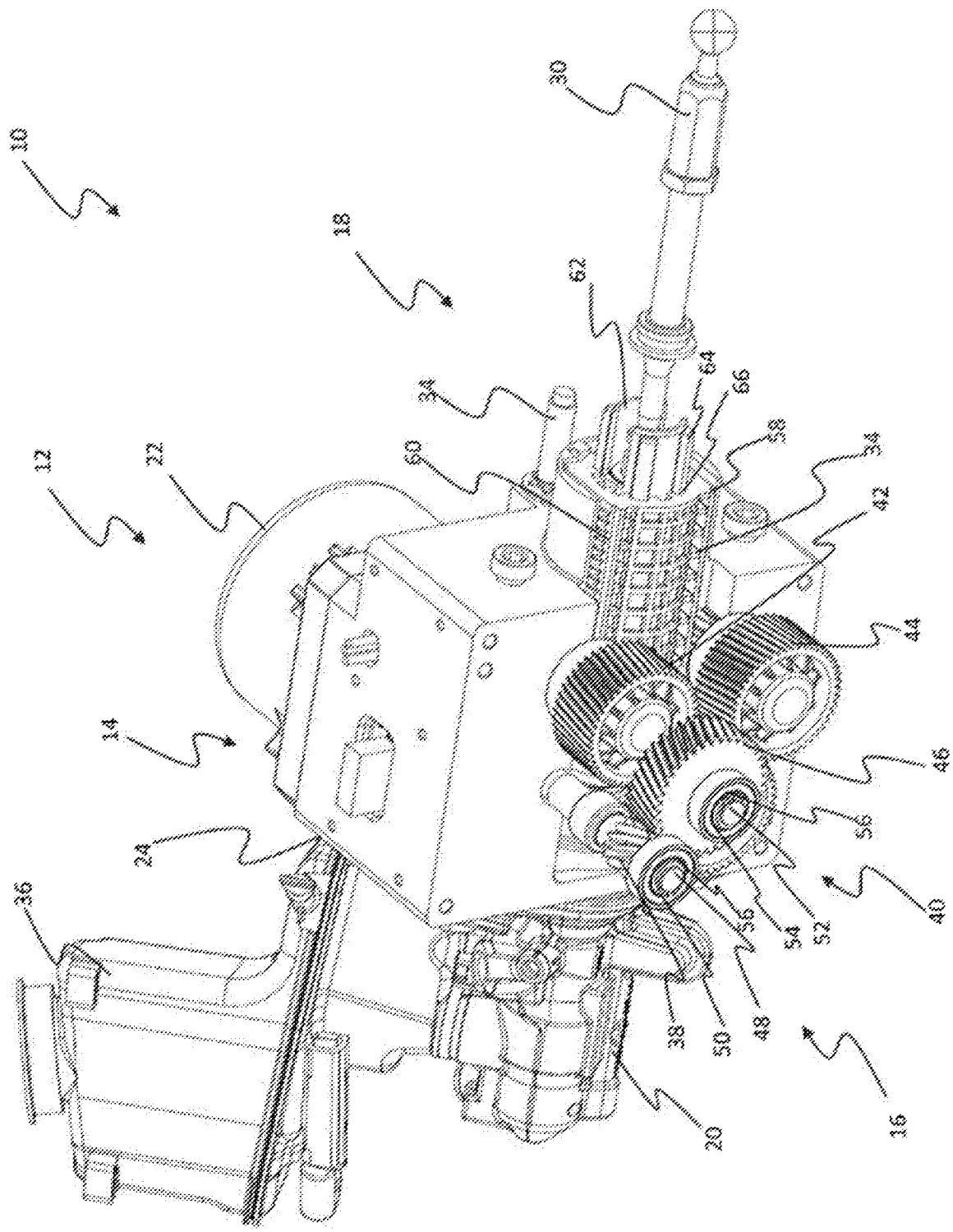
FIG. 3 shows a perspective view of an electromechanical brake force booster according to an exemplary embodiment.

FIG. 3 shows a perspective view of the electromechanical brake force booster 10 in which, in addition to the housing part 28, the housing part 26 has been removed. The actuating member 30 can actuate the electromechanical brake force booster 10 and the brake cylinder 20 which is coupled thereto. The actuating member 30 is coupled to the actuating device 18. The actuating device 18 has an actuating element 58 which is moveable in a translatory manner and can be driven by the gearing 16. The actuating element 58 which is moveable in a translatory manner has rack portions 60, of which only one can partially be seen on the upper side of the actuating element 58 in FIG. 3. Furthermore, the actuating device has an actuating unit 62. The actuating unit 62 is accommodated in the actuating element 58. With the actuating unit 62, the actuating force exerted on the actuating member 30 by actuation of the brake pedal can be at least partially transmitted to the brake cylinder 20. The actuating element 58 and the actuating unit 62 are moveable relative to each other along the longitudinal axis of the actuating device 18. Recesses 64 which interact with complementary projections 66 on the actuating unit 62 are formed in the receiving opening in the actuating element 58 for the actuating unit 62. The relative movement between the actuating element 58 and the actuating unit 62 is guided by the complementary recesses 64 and projections 66.

The actuating unit 62 can be acted upon with a brake force exerted on a brake pedal by a driver of the vehicle. As a result, the actuating unit 62 is moved in the direction of the brake cylinder 20. The boosting force requested by the driver is generated by the actuating device 18 which is driven by the electric motor 12 via the gearing 16. For this purpose, the actuating element 58 is moved in the direction of the brake cylinder 20 by the electric motor 12 via the gearing 16 and in particular via the gearwheels 70 and the rack portions 60 in order additionally to conduct the boosting force requested by the driver into the brake cylinder 20. By means of the movement of the actuating device 18 with its actuating unit 62 and its actuating element 58 in the direction of the brake cylinder 20, a hydraulic pressure is produced in the brake cylinder 20, the hydraulic pressure corresponding to the brake pressure requested by the driver. Via the brake cylinder 20, the brake circuits of the vehicle can be acted upon with hydraulic fluid and therefore with hydraulic pressure in order to produce a brake force at the wheel brakes.

Figure 4:
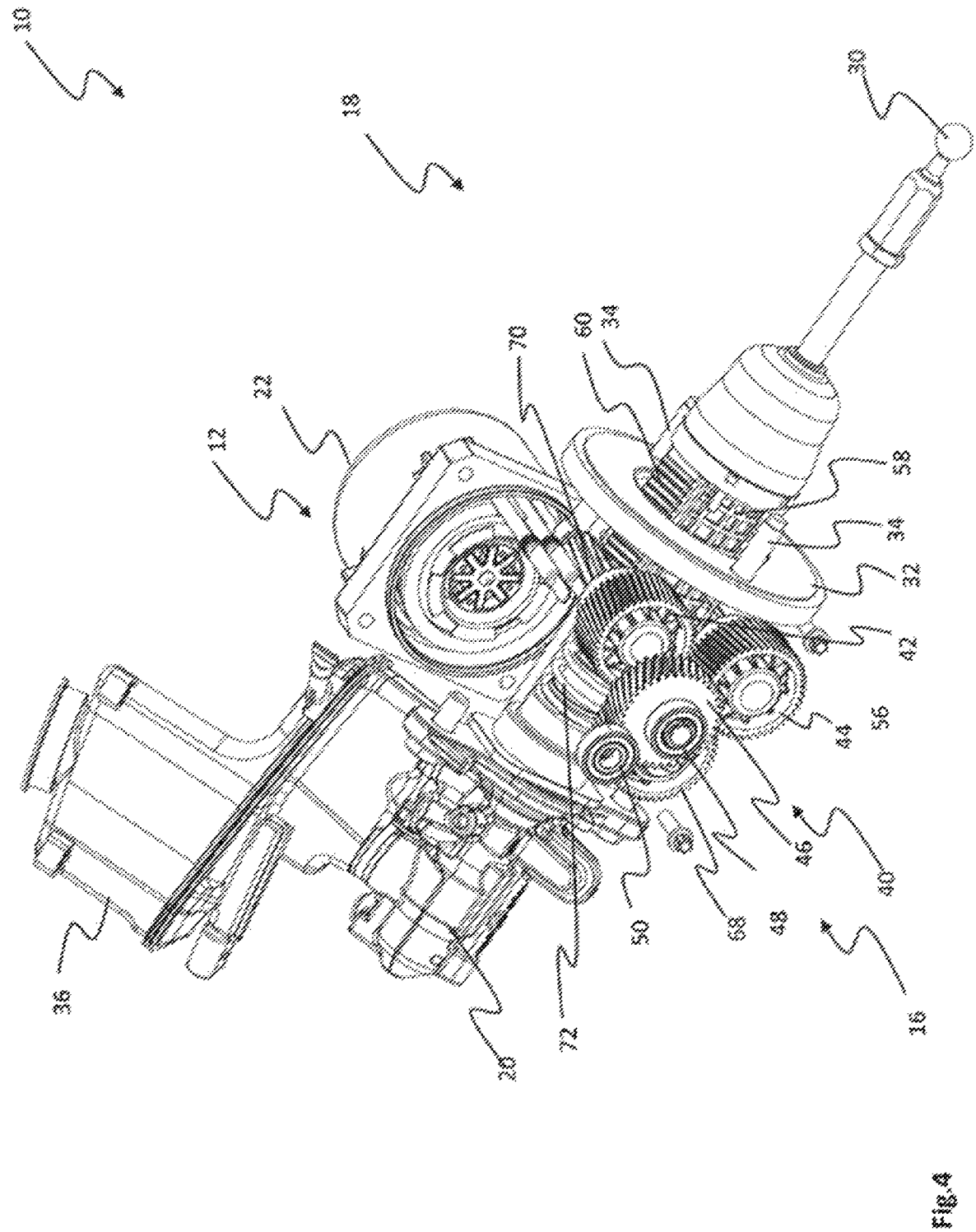
FIG. 4 shows a perspective view of an electromechanical brake force booster according to an exemplary embodiment.

FIG. 4 shows a perspective view of the electromechanical brake force booster 10 in which, in addition to the housing parts 26 and 28, the housing part 24 has been removed. Next to the intermediate gearing stage 40 and the spur gears 42 and 44, the gearing 16 has an intermediate gear 68. The intermediate gearing stage 40 drives the first spur gear 42 directly and drives the second spur gear 44 via the intermediate gear 68. The spur gears 40 and 42 are connected in torque-transmitting fashion to gearwheels 70. Only the gearwheel 60 on the first spur gear 38 can be seen in FIG. 4. The gearwheels 70 are arranged coaxially to the spur gears 42 and 44. The gearwheels 70 are in engagement with the rack portions 60 on the actuating element 58, which is moveable in a translatory manner, of the actuating device 18. The gearwheels 70 together with the rack portions 60 form a conversion gearing which converts the rotation of the gearwheels 70 into a translatory movement of the actuating element 58 of the actuating device 18.

The motor 12 with its housing 22 is provided on a different side of the actuating device 18 from the gearing 16. A spring 72 of the actuating device 18 can be seen between the gearing 16 or the gearwheels thereof and the motor 12.

Figure 5:
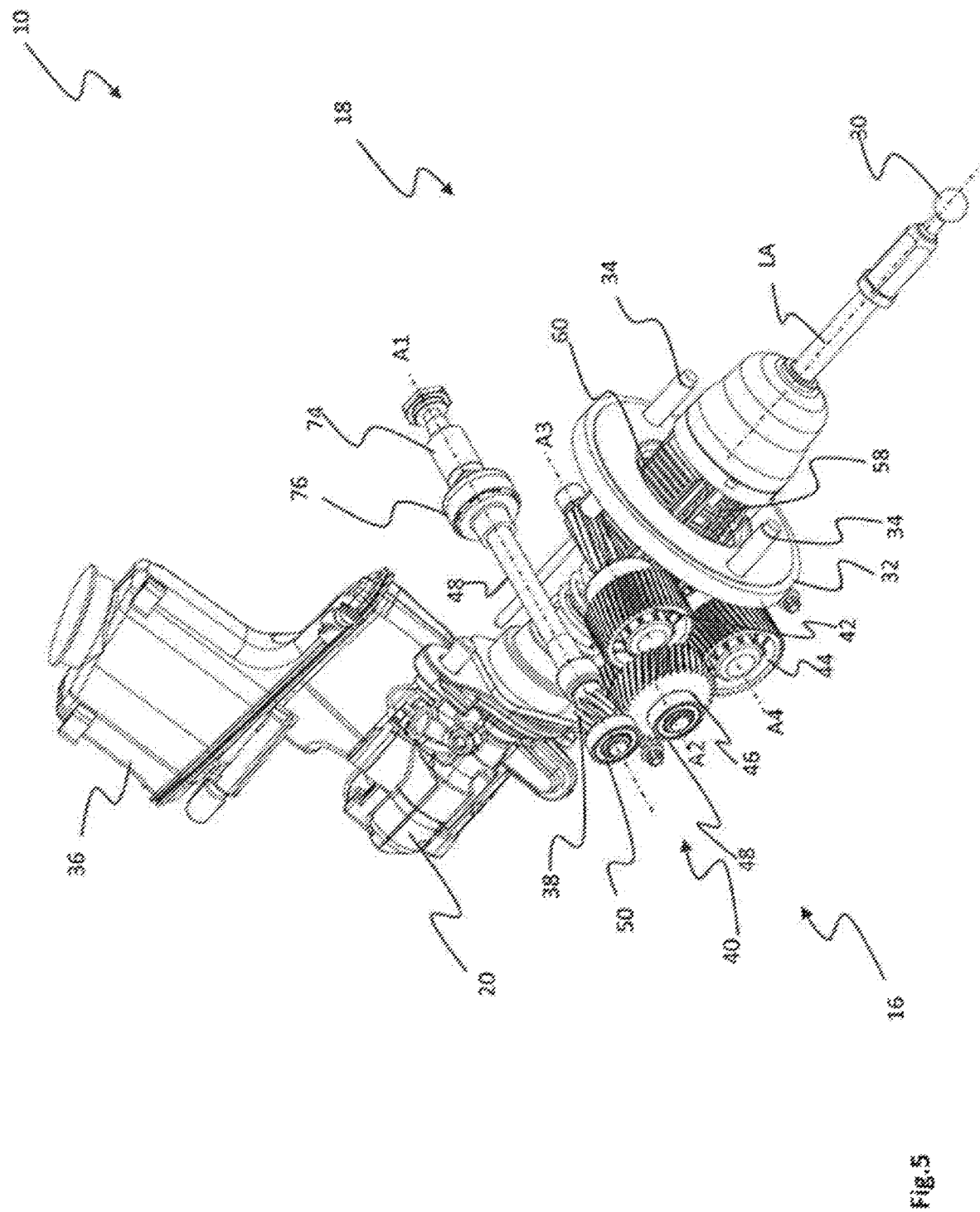
FIG. 5 shows a perspective view of an electromechanical brake force booster according to an exemplary embodiment.

FIG. 5 shows a further perspective view of the electromechanical brake force booster 10. An output shaft 74 of the motor 12 is coupled to the input shaft 48 of the gearing 16 via a clutch 76. The input gearwheel 38 and the bearing 50 are arranged on the input shaft 48. The input gearwheel 48 drives the intermediate gearing stage 40 which drives the first spur gear 42 directly and drives the second spur gear 44 via the intermediate gear 68. The spur gears 42 and 44 drive the gearwheels 70. The gearwheels 70 are in engagement with the rack portions 60 in order to move the actuating element 58 of the actuating device 18 in a translatory manner for actuating the brake cylinder 20.

FIG. 5 illustrates the axes of rotation A1 of the electric motor 12 which corresponds to the axes of rotation of the input shaft 38 of the gearing 16 and of the output shaft 74 of the motor 12, the axis of rotation A2 of the intermediate gearing stage 40 and the axes of rotation A3 and A4 of the spur gears 42 and 44. Furthermore, the longitudinal axis LA of the actuating device 18 is illustrated. The axes of rotation A1, A2, A3 and A4 extend perpendicularly to the longitudinal axis LA of the actuating device 18. The axes of rotation A1, A2, A3 and A4 run parallel to one another.

Figure 6:
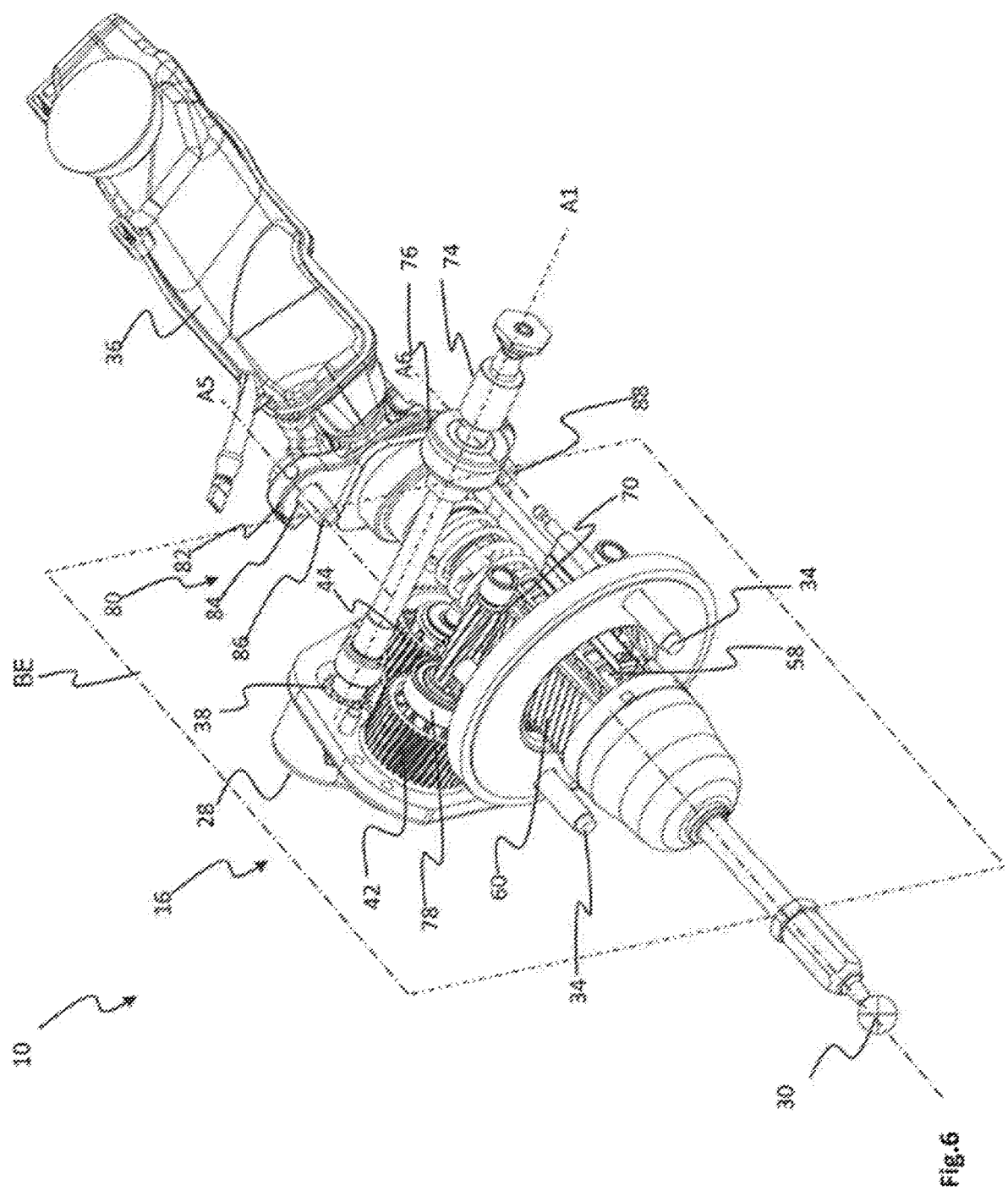
FIG. 6 shows a perspective view of an electromechanical brake force booster according to an exemplary embodiment.

FIG. 6 shows a further perspective view of the electromechanical brake force booster 10, in which one of the housing parts assigned to the gearing 16, the housing part 26, is shown. The spur gear 42 is arranged coaxially to the gearwheel 70 and is connected to the gearwheel 70 for conjoint rotation. A bearing 78 is provided on the spur gear 42 or the gearwheel 70. The bearing 78 serves for mounting the spur gear 40 with the gearwheel 70 on the housing part 26 (see FIG. 1).

The input shaft 48 of the gearing 16 extends transversely with respect to the longitudinal axis LA of the actuating device 18, and therefore the input shaft 48 extends from that side of the actuating device 18 on which the gearing 16 is arranged to that side of the actuating device 18 on which the motor 12 is arranged. On the side of the actuating device 18 with the motor 12, the input shaft 44 is coupled with the clutch 76 to the output shaft 74 of the motor 12 (see FIG. 4).

The electromechanical brake force booster 10 has a fastening device 80. The fastening device 80 comprises a flange 82 with openings 84 and fastening bolts 86, 88. The fastening bolts 86, 88 are connected fixedly to the assembly or the flange 82 on the brake cylinder 20. The fastening bolts 86, 88 span a fastening plane BE. The fastening plane BE extends through the center axes A5 and A6 of the fastening bolts 86, 88. The longitudinal axis AL of the actuating device 18 lies in the fastening plane BE. The axis of rotation A1 of the electric motor 12 runs perpendicularly to the longitudinal axis LA of the actuating device 18 and of the brake cylinder 20. The axis of rotation A1 of the electric motor 12 runs perpendicularly to the fastening plane BE. The same is true of the axis of rotation A2 of the intermediate gearing stage 40 and the axes of rotation A3 and A4 of the spur gears 42, 44 and of the components connected to the spur gears 42, 44. The axis of rotation A1 does not have to run perpendicularly to the fastening plane, but rather can also extend at an angle of 60 to 120° with respect to the fastening plane.

Figure 7:
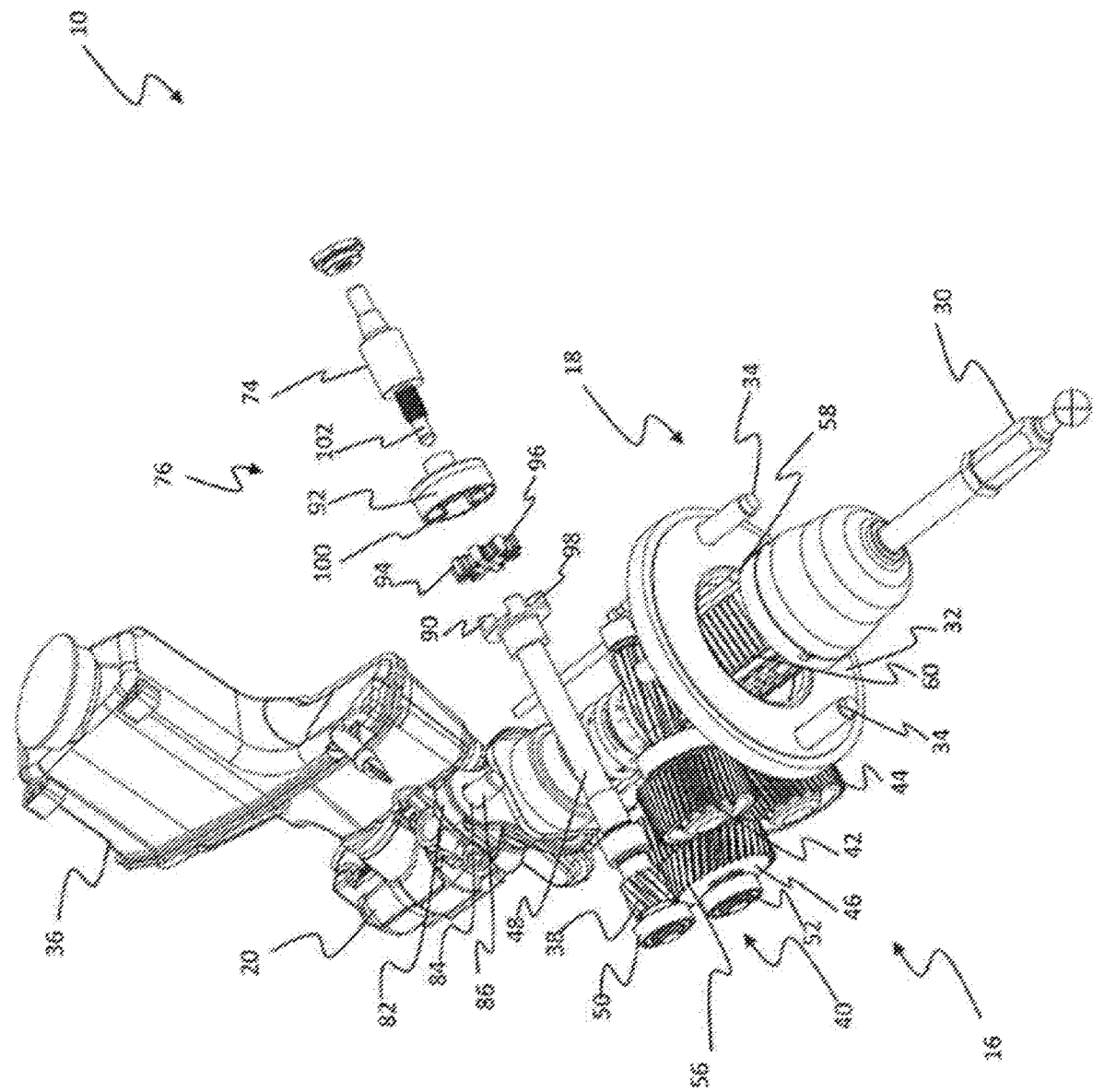
FIG. 7 shows a perspective view of an electromechanical brake force booster according to an exemplary embodiment.

FIG. 7 shows a further perspective view of the electromechanical brake force booster 10. In contrast to FIGS. 5 and 6, the clutch 76 in FIG. 7 is illustrated in the separated state. A first clutch part 90 is arranged on the input shaft 48 of the gearing 16. A second clutch part 92 is assigned to the output shaft 74 of the motor 12. An intermediate piece 94 is arranged between the first clutch part 90 and the second clutch part 92. The intermediate piece 94 is of substantially star-shaped design and has a multiplicity of arms 96. Protruding projections 98 are formed on the first clutch part 90. Corresponding projections 100 are formed on the second clutch part 92. The intermediate piece 84 is introduced between the two clutch parts 90 and 92 in such a manner that one of the arms 96 of the intermediate piece 94 is in each case arranged between the projections 98 of the clutch part 90 and the projections 100 on the clutch part 92. The intermediate piece 94 can be of flexible or elastic design in order to be able to prevent damage to the gearing 16 or the electric motor 12 due to an overload. The output shaft 74 of the motor 12 has a centering portion 102 which extends through the clutch 76 in the direction of the input shaft 48. An opening (not shown) is formed in the input shaft 48, said opening receiving the end portion of the centering portion 102, and therefore the input shaft 48 and the output shaft 74 are centered with respect to each other and imbalances cannot occur.

Figure 8:
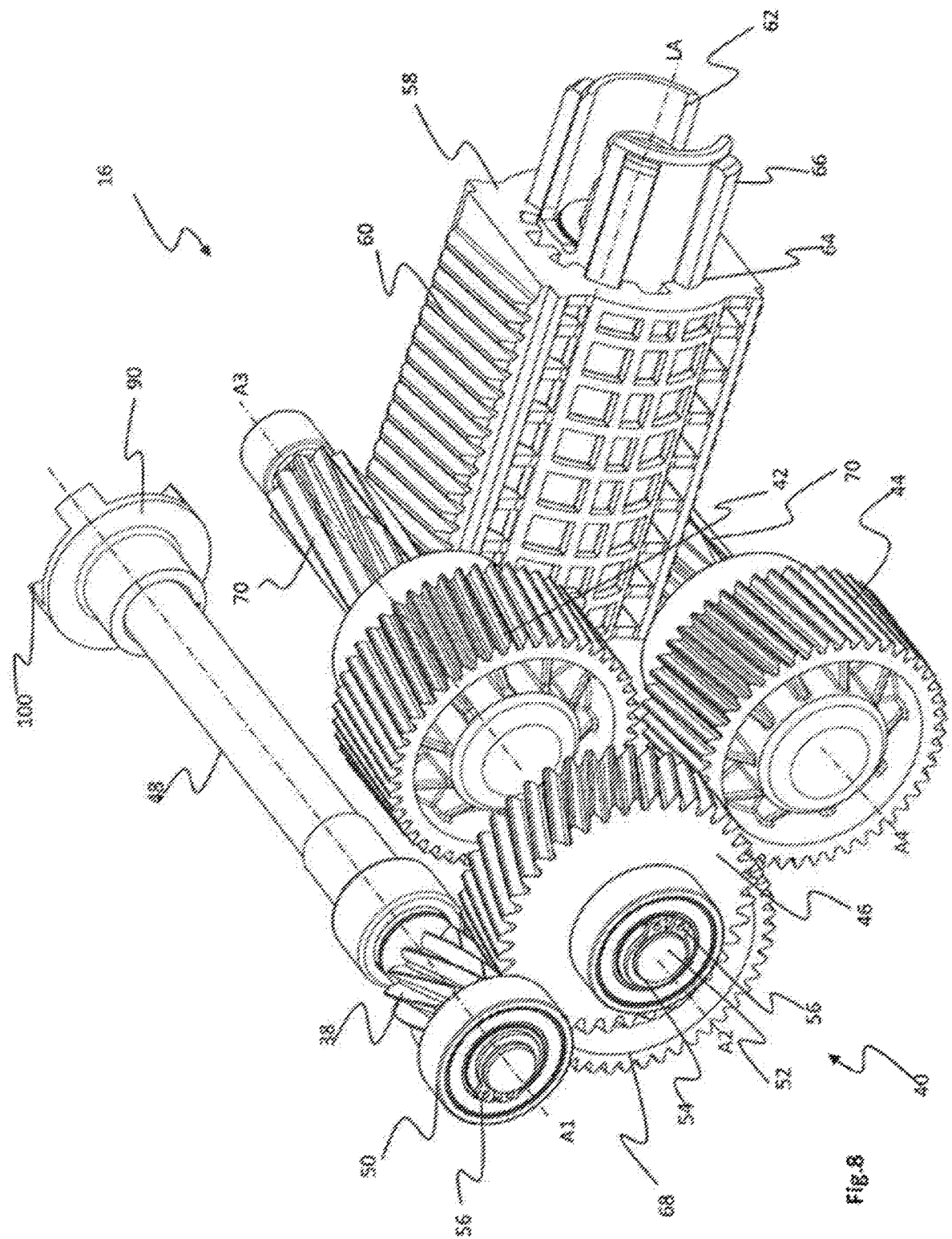
FIG. 8 shows a perspective view of a gearing of the electromechanical brake force booster.

FIG. 8 shows a perspective view of the gearing 16. The gearing 16 is driven via the input shaft 48 which is driven by the electric motor (not shown). The clutch part 80 with its projections 88 can be seen on the input shaft 48. The input shaft 48 has the input gearwheel 38. Via the input gearwheel 38, the input shaft 48 drives the first gearwheel 46 of the intermediate gearing stage 40. The first gearwheel 46 drives a second gearwheel (not shown) which is coaxial to the first gearwheel 46. The second gearwheel drives the first spur gear 42 directly and drives the second spur gear 44 via the intermediate gearwheel (not shown). The spur gears 42 and 44 for their part drive the gearwheels 70 which are coaxial to them. The gearwheels 70 are in engagement with the rack portions 60 of the actuating element 58. By means of the rack portions 60, the rotational movement of the gearwheels 70 can be converted into a translatory movement of the actuating element 58. The actuating element 58 can be moved by the drive via the gearing 16 in a translatory manner relative to the actuating unit 62 in order to actuate the brake cylinder (not shown).

The axes of rotation A1, A2, A3 and A4 of the electric motor (not shown), which corresponds to the axis of rotation of the input shaft 38, of the intermediate gearing stage 40 and of the spur gears 42 and 44 are likewise entered in FIG. 8. The axes of rotation A1, A2, A3 and A4 extend perpendicularly to the longitudinal axis LA of the actuating device 18. It can furthermore be seen in FIG. 8 that the gearwheels 70 are arranged coaxially to the spur gears 42 and 44 assigned thereto.

Figure 9:
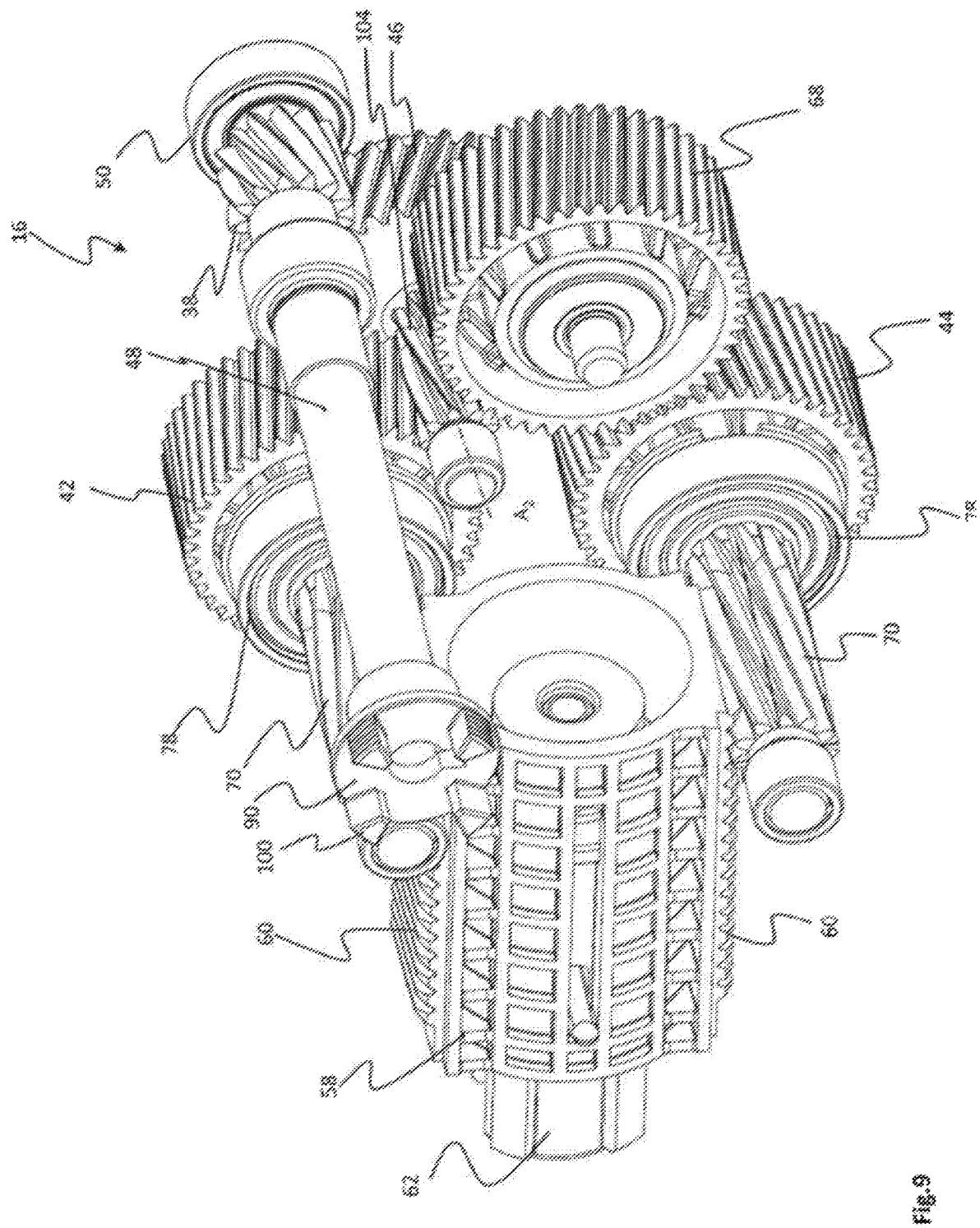
FIG. 9 shows a perspective view of a gearing of the electromechanical brake force booster.

FIG. 9 shows a perspective view of the gearing 16 as viewed from the direction of the motor (see FIG. 1). The actuating unit 62 is accommodated in the actuating element 58, which actuating unit can at least partially transmit a force exerted on the brake pedal by a driver to the brake cylinder (not shown). The intermediate gearing stage 40 has a second gearwheel 104 which is coaxial to the first gearwheel 46. The spur gear 42 is driven directly via the gearwheel 104, and the spur gear 44 via the intermediate gear 68. The intermediate gear 68 serves for reversing the direction of rotation, and therefore the spur gears 42 and 44 have opposed directions of rotation. By means of the opposed directions of rotation, the gearwheels 70 on the spur gears 42 and 44 can move the actuating element 58 in a translatory manner. The spur gears 42 and 44 are mounted together with the gearwheels 70 via bearing elements 78 in the form of rolling bearings. The gearwheel 104 has a smaller diameter than the gearwheel 46, and therefore the intermediate gearing stage 40 can provide a step-down. The gearwheels 70 likewise have a smaller diameter than the spur gears 42 and 44.

Figure 10:
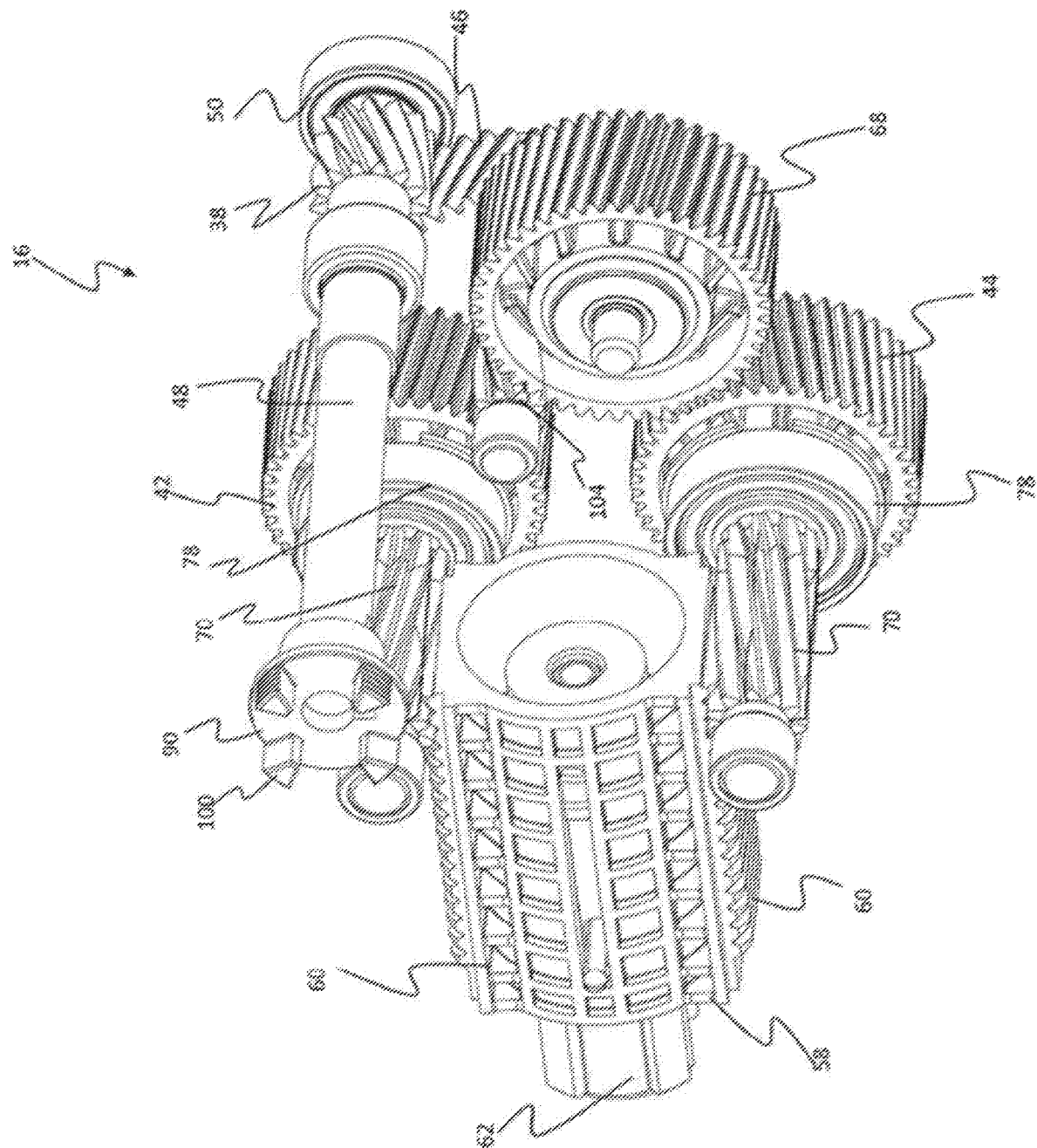
FIG. 10 shows a perspective view of a gearing of the electromechanical brake force booster.

FIG. 10 shows a further perspective view of the gearing 16. The actuating unit 62 is accommodated in a receiving opening in the actuating element 58 and can be moved relative to the actuating element. To boost the brake force, the actuating element 58 is driven via the gearing 16 and moved in a translatory manner relative to the actuating unit 62 in order to further actuate the brake cylinder, which is not shown in FIG. 10.

Figure 11:
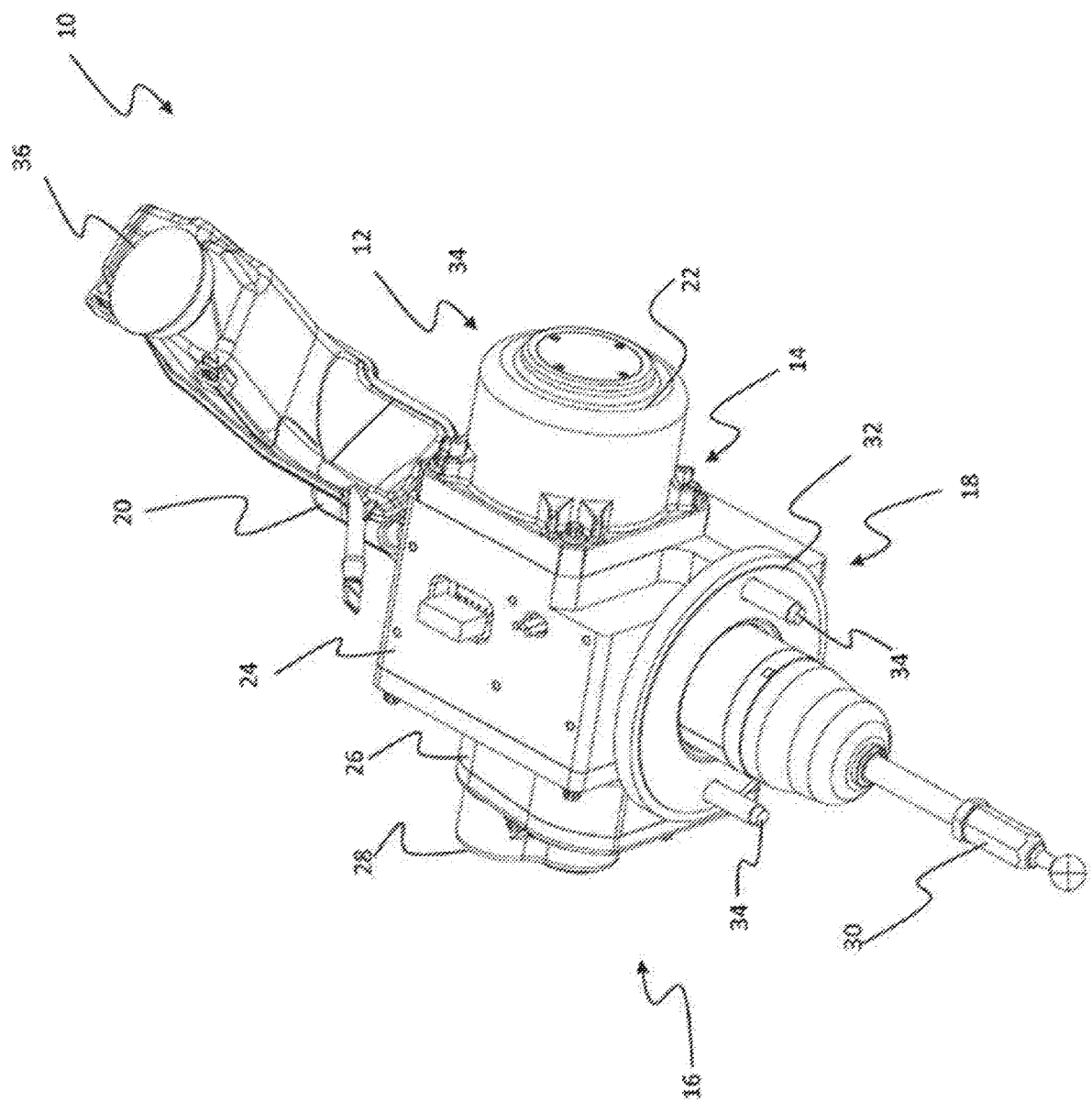
FIG. 11 shows a perspective view of the electromechanical brake force booster with the electric motor in the attached state.

FIG. 11 shows a perspective view of the electromechanical brake force booster 10, which view shows the electromechanical brake force booster 10 in a different viewing angle from FIG. 1. FIG. 11 shows the multipart housing of the brake force booster with the housing parts 22, 24, 26, 28. Furthermore, FIG. 11 shows the covering element 32 which is arranged around the actuating device 18, and the fastening elements 34.

Figure 12:
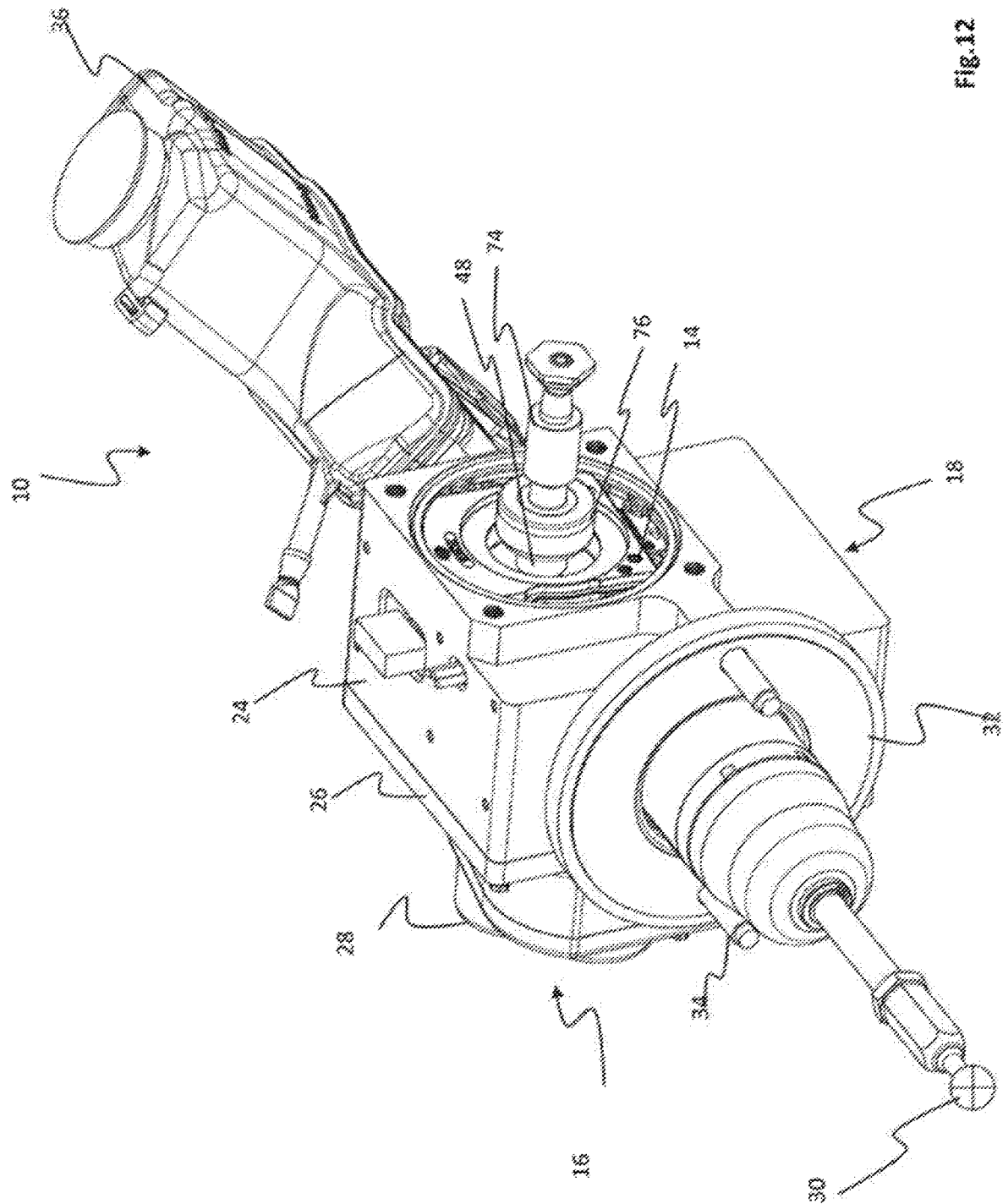
FIG. 12 shows a perspective view of the electromechanical brake force booster with the electric motor in the attached state.

FIG. 12 shows a perspective view of the brake force booster 10, in which the motor 12 with the housing part 22 assigned thereto has been removed. The output shaft 74 of the electric motor 12 is coupled to the input shaft 48 of the gearing 16 via the clutch 76. The motor 12 together with its housing 22 forms a module which is removable from the actuating device 18.

Figure 13:
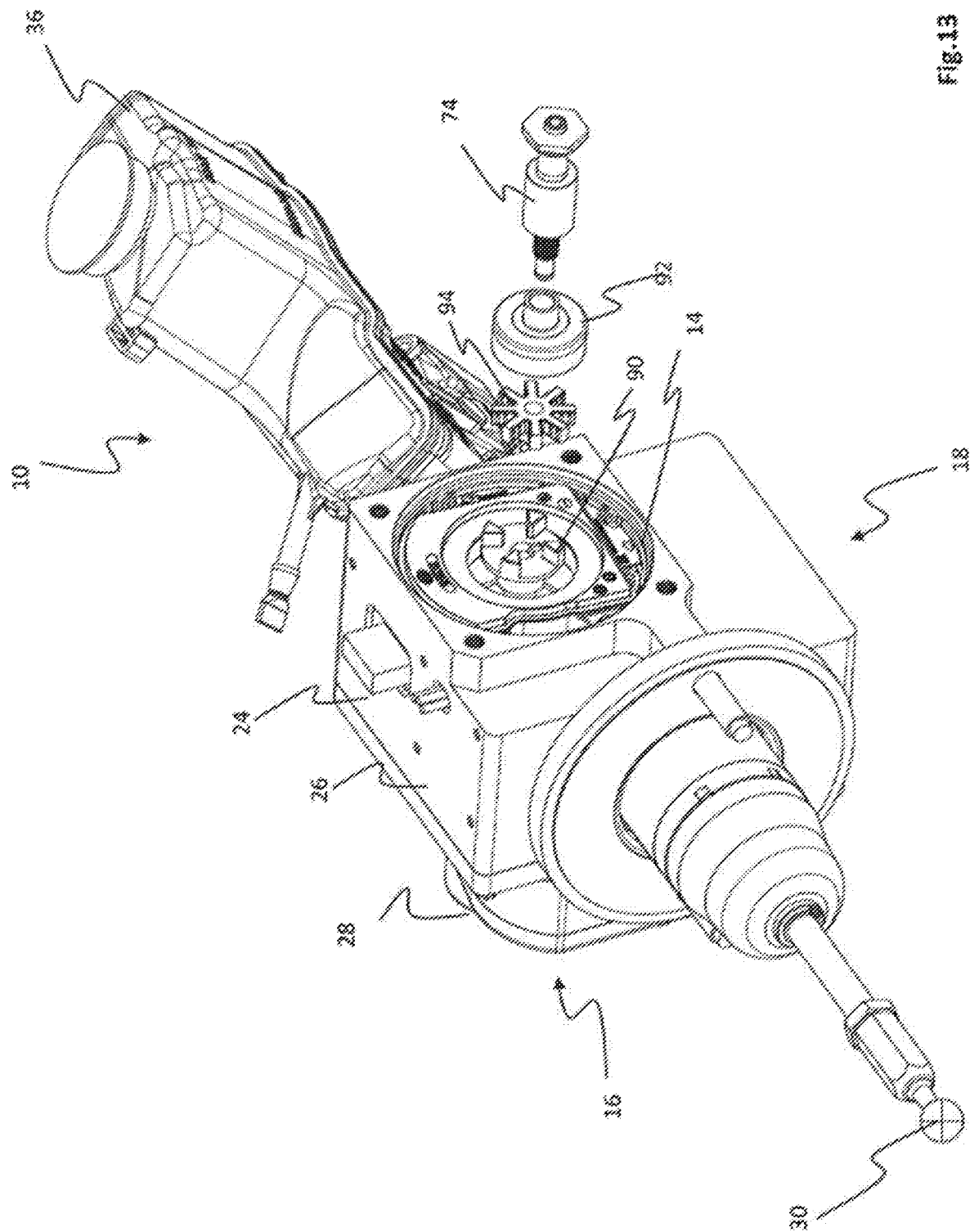
FIG. 13 shows a perspective view of the electromechanical brake force booster with the electric motor in the removed state.

FIG. 13 shows a further perspective view of the electromechanical brake force booster 10, in which the individual parts of the clutch 76 are shown. The first clutch part 90 is arranged on the input shaft 48 of the gearing 12. The second clutch part 92 can be connected to the motor output shaft 74. The intermediate piece 94 is accommodated between the clutch parts 90 and 92. The control unit 14 is accommodated in the housing 24. The control unit 14 is accessible after removal of the motor 12. The control unit 14 is arranged around the input shaft 48 of the gearing 16. In other words, the input shaft 48 extends through an opening in the control unit 14.

Figure 14:
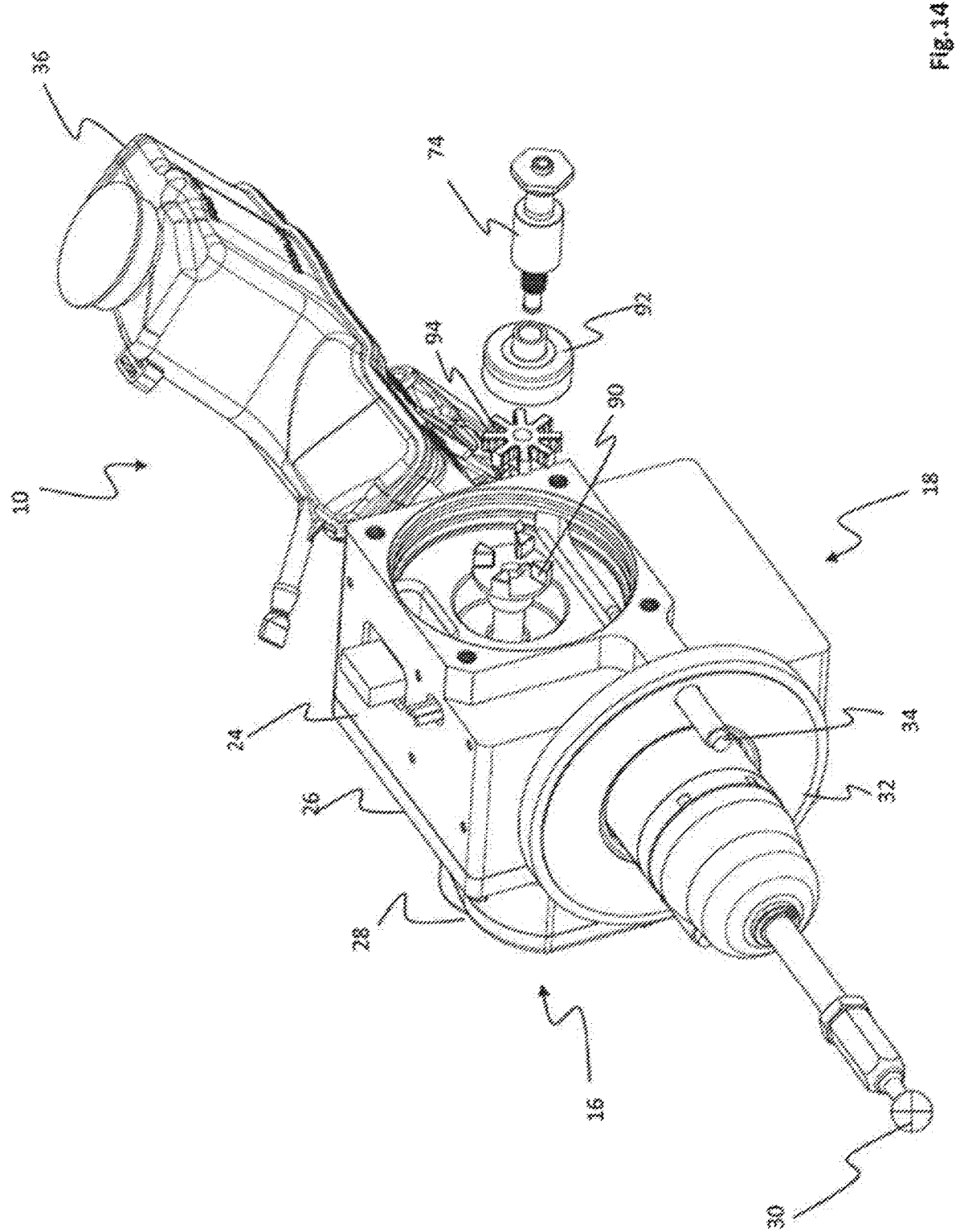
FIG. 14 shows a perspective view of the electromechanical brake force booster with the electric motor in the removed state.

FIG. 14 shows a perspective view of the electromechanical brake force booster 10, in which the control unit 14 has also been removed from the brake force booster. This is confirmed, inter alia, by the longer visible portion of the input shaft 48 of the gearing 16 in comparison with FIG. 13.

Figure 15:
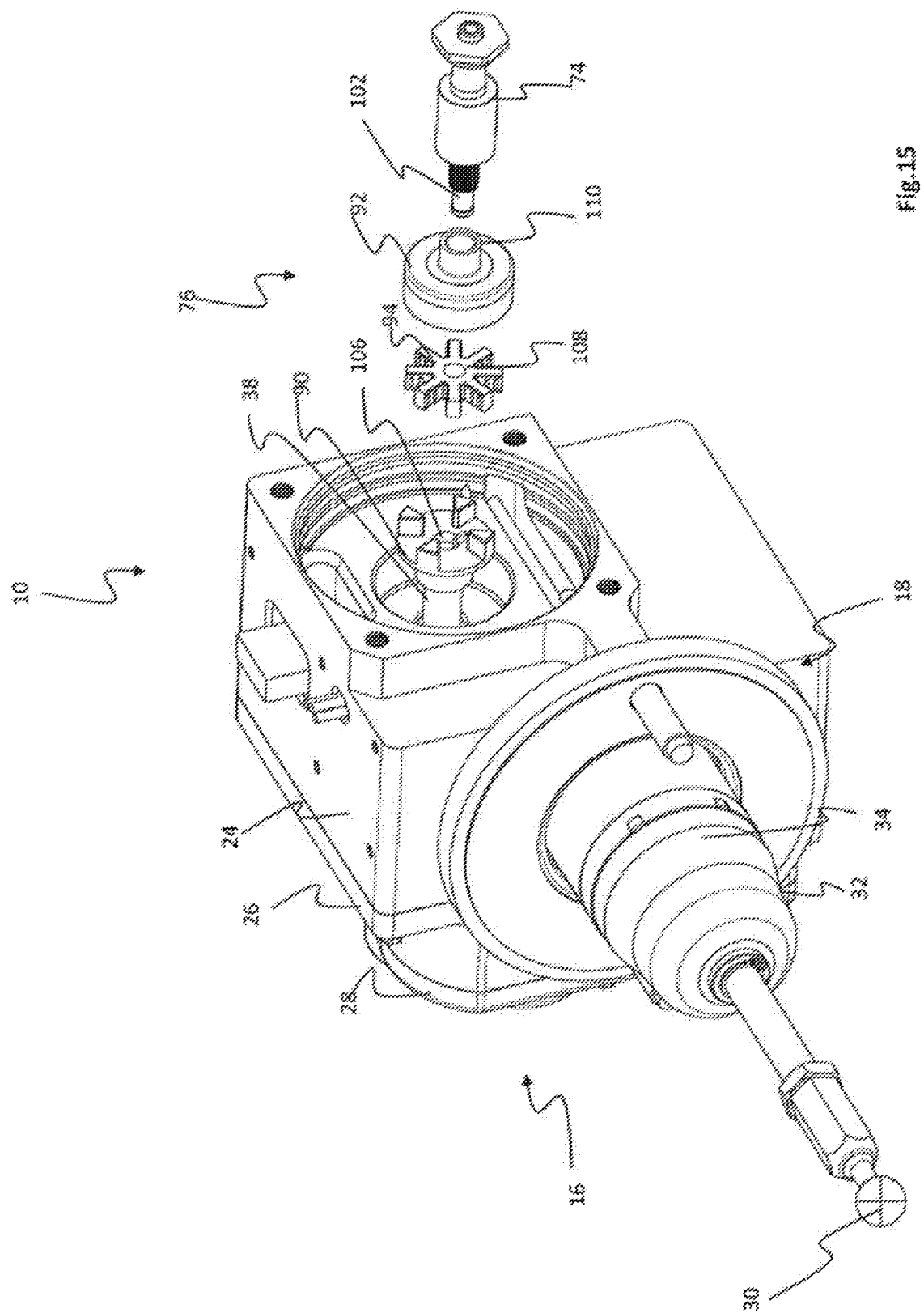
FIG. 15 shows a perspective view of the electromechanical brake force booster with the electric motor in the removed state.

FIG. 15 shows a further perspective view of the electromechanical brake force booster 10. The input shaft 48 and the clutch parts 90, 92 and the intermediate piece 94 each have an opening 106, 108, 110 through which the centering portion 102 extends. The centering portion 102 or its the end portion is accommodated in the opening (not shown) in the input shaft 44 of the gearing 16, which opening is connected to the opening 106 of the clutch part 90, in order to be able to center the output shaft 74 of the motor 12 and the input shaft 48 of the gearing 16 to prevent imbalances.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electromechanical brake force booster for an electrohydraulic vehicle brake system, the electromechanical brake force booster comprising:
   a drive arrangement for driving at least one actuating device for actuating a brake cylinder, wherein the drive arrangement has at least one electric motor and a gearing for coupling the electric motor to the at least one actuating device,
   wherein the gearing has at least one first spur gear and at least one second spur gear, the first spur gear and the second spur gear both driving the actuation device,
   wherein the gearing furthermore has an intermediate gearing stage which couples the electric motor to the first spur gear and to the second spur gear in torque-transmitting fashion, wherein the intermediate gearing stage comprises a gearwheel which drives the first spur gear directly and which drives the second spur gear via at least one intermediate gear of the intermediate gearing stage,
   an input shaft of the gearing extends transversely with respect to the longitudinal axis (LA) of the actuating device,
   wherein the first spur gear and the second spur gear are each connected to a first shaft and a second shaft, respectively, the first shaft having at least one gearwheel and the second shaft having at least one gearwheel.

2. The electromechanical brake force booster as claimed in claim 1, wherein the intermediate gearing stage has at least one first gearwheel and at least one second gearwheel coaxial to the first gearwheel, the second gearwheel being the gearwheel which drives the first spur gear directly and which drives the second spur gear via the at least one intermediate gear of the intermediate gearing stage.

3. The electromechanical brake force booster as claimed in claim 2, wherein the gearing has an input gearwheel which is driven by the electric motor and drives the first gearwheel of the intermediate gearing stage.

4. The electromechanical brake force booster as claimed in claim 2, wherein the intermediate gearing stage is a spur gearing, and the first gearwheel and the second gearwheel of the intermediate gearing stage form a double gearwheel.

5. The electromechanical brake force booster as claimed in claim 2, wherein the first gearwheel of the intermediate gearing stage is arranged offset with respect to the second gearwheel of the intermediate gearing stage, the first spur gear and the second spur gear in the direction of the axis of rotation (A1) of the electric motor.

6. The electromechanical brake force booster as claimed in claim 2, wherein an input gearwheel and the first gearwheel of the intermediate gearing stage are arranged in a first plane perpendicular to the axis of rotation (A1) of the electric motor.

7. The electromechanical brake force booster as claimed in claim 1, wherein the electromechanical brake force booster has a multipart housing, wherein at least one housing part of the multipart housing is assigned to the gearing.

8. The electromechanical brake force booster as claimed in claim 7, wherein the input shaft of the gearing is mounted on the housing part.

9. The electromechanical brake force booster as claimed in claim 7, wherein the intermediate gearing stage is mounted on the housing part.

10. The electromechanical brake force booster as claimed in claim 1, wherein a clutch is provided between the electric motor and the gearing that couples an output shaft of the electric motor to the input shaft of the gearing, wherein the gearing comprises an input gearwheel which is driven by the electric motor and which is provided on the input shaft of the gearing.

11. The eletromechanical brake force booster as claimed in claim 1, wherein the actuating device has at least one rack portion which is coupleable to the gearing.

12. The electromechanical brake force booster as claimed in claim 1, wherein the actuating device has a first and a second rack portion which are couplable to the gearing and which are arranged on opposite sides of the actuating device.

13. The electromechanical brake force booster as claimed in claim 1, wherein the electric motor and the gearing are arranged on opposite sides of the actuating device.

14. The electromechanical brake force booster as claimed in claim 1, wherein at least the first spur gear, the second spur gear and the intermediate gear have a helical toothing.

15. The electromechanical brake force booster as claimed in claim 1, wherein the drive arrangement has at least one control unit which is configured for actuating the at least one electric motor.

16. The electromechanical brake force booster as claimed in claim 1, wherein the actuating device has at least one actuating unit which can be acted upon with a pedal force exerted on a brake pedal, and at least one actuating element which is driven by the electric motor via the gearing.

17. The electromechanical brake force booster as claimed in claim 1, wherein the electromechanical brake force booster is attachable to a vehicle via at least one fastening device, wherein the at least one fastening device defines a fastening plane (BE) in which the longitudinal axis (LA) of the at least one actuating device lies.

18. An electromechanical brake force booster for an electrohydraulic vehicle brake system, the electromechanical brake force booster comprising:
 a drive arrangement for driving at least one actuating device for actuating a brake cylinder, wherein the drive arrangement has at least one electric motor and a gearing for coupling the electric motor to the at least one actuating device,
 wherein the gearing has at least one first spur gear and at least one second spur gear, the first spur gear and the second spur gear both driving the actuation device,
 wherein the gearing furthermore has an intermediate gearing stage which couples the electric motor to the first spur gear and to the second spur gear in torque-transmitting fashion, wherein the intermediate gearing stage comprises a gearwheel which drives the first spur gear directly and which drives the second spur gear via at least one intermediate gear of the intermediate gearing stage,
 wherein the intermediate gearing stage has at least one first gearwheel and at least one second gearwheel coaxial to the first gearwheel, the second gearwheel being the gearwheel which drives the first spur gear directly and which drives the second spur gear via the at least one intermediate gear of the intermediate gearing stage, wherein an input gearwheel and the first gearwheel of the intermediate gearing stage are arranged in a first plane perpendicular to the axis of rotation (A1) of the electric motor,
 wherein the second gearwheel, the first spur gear, the intermediate gear and the second spur gear are arranged in a second plane perpendicular to the axis of rotation (A1) of the electric motor, the second plane being different than the first plane.

19. An electromechanical brake force booster for an electrohydraulic vehicle brake system, the electromechanical brake force booster comprising:
 a drive arrangement for driving at least one actuating device for actuating a brake cylinder, wherein the drive arrangement has at least one electric motor and a gearing for coupling the electric motor to the at least one actuating device,
 wherein the gearing has at least one first spur gear and at least one second spur gear, the first spur gear and the second spur gear both driving the actuation device,
 wherein the gearing furthermore has an intermediate gearing stage which couples the electric motor to the first spur gear and to the second spur gear in torque-transmitting fashion, wherein the intermediate gearing stage comprises a gearwheel which drives the first spur gear directly and which drives the second spur gear via at least one intermediate gear of the intermediate gearing stage,
 wherein the drive arrangement in the state mounted in a vehicle is arranged in such a manner that the axis of rotation (A1) of the electric motor runs perpendicularly to the longitudinal axis (LA) of the actuating device and at a predetermined angle with respect to the vertical axis of the vehicle,
 wherein the intermediate gearing stage has at least one first gearwheel and at least one second gearwheel coaxial to the first gearwheel, the second gearwheel being the gearwheel which drives the first spur gear directly and which drives the second spur gear via the at least one intermediate gear of the intermediate gearing stage.

20. The electromechanical brake force booster as claimed in claim 19, wherein the first spur gear and the second spur gear are each connected to a first shaft and a second shaft, respectively, the first shaft having at least one gearwheel and the second shaft having at least one gearwheel.

* * * * *